United States Patent
Kim et al.

(10) Patent No.: US 9,995,402 B2
(45) Date of Patent: Jun. 12, 2018

(54) TWO-WAY GATE VALVE

(71) Applicants: PRESYS.CO.,LTD, Suwon-si (KR); PSK INC., Hwaseong-si (KR)

(72) Inventors: Bae-Jin Kim, Suwon-si (KR); Ki Sun Choi, Suwon-si (KR); Kang Hyun Kim, Suwon-si (KR); Sang Min Kim, Suwon-si (KR); Sun Yeol Seo, Suwon-si (KR)

(73) Assignees: PRESYS.CO.,LTD, Suwon-si (KR); PSK INC., Hwaseong-si (KR)

( * ) Notice: Subject to any disclaimer, the term of this patent is extended or adjusted under 35 U.S.C. 154(b) by 40 days.

(21) Appl. No.: 15/230,640

(22) Filed: Aug. 8, 2016

(65) Prior Publication Data

US 2017/0089472 A1    Mar. 30, 2017

(30) Foreign Application Priority Data

Sep. 25, 2015  (KR) .................. 10-2015-0136296

(51) Int. Cl.
F16K 3/18    (2006.01)
F16K 3/02    (2006.01)
F16K 3/314   (2006.01)
F16K 3/316   (2006.01)
F16K 51/02   (2006.01)

(52) U.S. Cl.
CPC .............. *F16K 3/184* (2013.01); *F16K 3/029* (2013.01); *F16K 3/0218* (2013.01); *F16K 3/0281* (2013.01); *F16K 3/182* (2013.01); *F16K 3/314* (2013.01); *F16K 3/3165* (2013.01); *F16K 51/02* (2013.01)

(58) Field of Classification Search
CPC ...... F16K 3/0218; F16K 3/0281; F16K 3/029; F16K 3/182; F16K 3/184; F16K 3/314; F16K 3/3165; F16K 51/02; F16K 3/18
See application file for complete search history.

(56) References Cited

U.S. PATENT DOCUMENTS 2,776,813 A * 1/1957 Blackman ............... F16K 3/184
                                                    251/197
2,876,986 A * 3/1959 Knox .................... F16K 3/184
                                                    251/200

(Continued)

FOREIGN PATENT DOCUMENTS

KR       20030050409      6/2003
WO    WO 2013151403 A1 * 10/2013 ............. F16K 3/182

*Primary Examiner* — Reinaldo Sanchez-Medina
*Assistant Examiner* — David Colon Morales
(74) *Attorney, Agent, or Firm* — PatentFile, LLC; Bradley C. Fach

(57) ABSTRACT

Disclosed herein is an upper housing 100 having openings that are respectively defined in a front surface and a rear surface thereof and in which first and second moving paths 110 and 120 are defined; a first blade 200 installed in the upper housing 100 to move upward from a lower side, thereby opening/closing the first moving path 110; a first shaft 300 coupled to a lower portion of the first blade 200; a lower housing 400 disposed below the upper housing 100, in which a rotation guide groove 410 for guiding rotation of a L-motion block 500 at a fixed position while the first blade 200 moves in a close direction C is defined in each of both inner surfaces of the lower housing (400).

3 Claims, 13 Drawing Sheets

(56) References Cited

U.S. PATENT DOCUMENTS

| | | | | |
|---|---|---|---|---|
| 3,027,135 A * | 3/1962 | Kellar | F16K 3/184 | 251/199 |
| 3,321,174 A * | 5/1967 | Schertler | F16K 3/16 | 251/158 |
| 3,368,792 A * | 2/1968 | Schertler | F16K 3/184 | 251/158 |
| 4,052,036 A * | 10/1977 | Schertler | F16K 3/184 | 251/144 |
| 4,165,858 A * | 8/1979 | Thackrey | F16K 3/18 | 251/168 |
| 4,275,763 A * | 6/1981 | Fahrig | F16K 3/029 | 137/375 |
| 4,291,861 A * | 9/1981 | Faria | F16K 3/184 | 251/158 |
| 4,408,634 A * | 10/1983 | Peacock | F16K 3/184 | 137/630.12 |
| 5,269,491 A * | 12/1993 | Reynolds | F16K 51/02 | 251/169 |
| 5,379,983 A * | 1/1995 | Geiser | F16K 3/18 | 251/167 |
| 5,415,376 A * | 5/1995 | Ito | F16K 3/18 | 251/158 |
| 5,626,324 A * | 5/1997 | Nakamura | F16K 3/18 | 251/158 |
| 5,881,998 A * | 3/1999 | Brenes | F15B 15/16 | 251/204 |
| 6,267,545 B1 * | 7/2001 | Mooring | F16K 3/18 | 414/217 |
| 6,390,448 B1 * | 5/2002 | Kroeker | F16K 3/188 | 251/167 |
| 6,612,546 B2 * | 9/2003 | Young | F16K 3/184 | 251/158 |
| 6,896,239 B1 * | 5/2005 | Brenes | F16K 3/182 | 251/326 |
| 6,913,243 B1 * | 7/2005 | Tomasch | F16K 3/18 | 251/167 |
| 7,100,892 B2 * | 9/2006 | Iwabuchi | F16K 3/184 | 251/187 |
| 7,766,305 B2 * | 8/2010 | Kim | F16K 51/02 | 251/158 |
| 8,382,066 B2 * | 2/2013 | Nagao | F16K 3/184 | 251/204 |
| 8,672,293 B2 * | 3/2014 | Ehrne | F16K 3/182 | 251/158 |
| 8,800,956 B2 * | 8/2014 | Ishigaki | F16K 3/16 | 251/203 |
| 9,429,239 B2 * | 8/2016 | Jee | F16K 3/182 | |
| 2014/0183391 A1 * | 7/2014 | Blecha | F16K 3/16 | 251/158 |
| 2017/0175904 A1 * | 6/2017 | Ahn | F16K 3/18 | |

* cited by examiner

TWO-WAY GATE VALVE

CROSS REFERENCE TO RELATED APPLICATIONS

This application claims priority to and the benefit of the filing date of Korean Patent Office Patent Application No. 10-2015-0136296, filed on Sep. 25, 2015, entitled "TWO-WAY GATE VALVE", which is hereby incorporated by reference in its entirety.

FIELD OF THE INVENTION

The present invention relates to a two-way gate valve including: an upper housing 100 having openings that are respectively defined in a front surface and a rear surface thereof and in which first and second moving paths 110 and 120 are defined; a first blade 200 installed in the upper housing 100 to move upward from a lower side, thereby opening/closing the first moving path 110; a first shaft 300 coupled to a lower portion of the first blade 200; a lower housing 400 disposed below the upper housing 100, in which a rotation guide groove 410 for guiding rotation of a L-motion block 500 at a fixed position while the first blade 200 moves in a close direction C is defined in each of both inner surfaces of the lower housing 400; the L-motion block 500 installed in the lower housing 400 and coupled to a lower portion of the first shaft 300, in which the L-motion block 500 includes a first roller 510 inserted into the rotation guide groove 410 on each of both upper portions thereof and a coupling part 520 connected to a moving unit 600 on a lower portion thereof; the moving unit 600 including a rotatable link 610 at a central portion thereof, in which the link 610 has one side connected to the coupling part 520 and the other side connected to a first driving unit 700 to rotate the L-motion block 500; the first driving unit 700 connected to the link 610 to vertically move the L-motion block 500; a second blade 800 installed in the upper housing 100 to move downward from an upper side, thereby opening/closing the first and second moving paths 110 and 120 at the same time, in which, while the first and second moving paths 110 and 120 are opened/closed, sealing plates 820 respectively disposed on both sides thereof are spread in outward directions to respectively seal the first and second moving paths 110 and 120; a second shaft 900 coupled to an upper portion of the second blade 800; a second driving unit 1000 disposed above the upper housing 100 and coupled to the second shaft 900 to vertically move the second blade 900.

BACKGROUND OF THE INVENTION

In general, since a semiconductor manufacturing process for manufacturing a semiconductor device requires a high degree of precision, a high degree of cleanliness and a special manufacturing technique are required.

Due to the above-mentioned reason, a product having high reliability and a high degree of completion may be manufactured in a state in which the semiconductor device is completely prevented from contacting foreign substances contained in the air, i.e., a vacuum state.

Meanwhile, a vacuum pump suctioning the air and other gases in a process chamber is installed outside the process chamber to maintain the vacuum state in the process chamber for manufacturing the semiconductor device.

Also, a gate valve is installed between the process chamber and the vacuum pump. The gate valve may be opened when the vacuum pump discharges the air and other gasses in the process chamber and closed when the vacuum state in the process chamber is maintained to always maintain the inside of the process chamber in the clean vacuum state.

In a rectangular gate valve including an air cylinder maintaining vacuum by using O-rings to ascend/descend a shaft and a main body including a rectangular disk and a rectangular passage thereabove, the mount type rectangular gate valve disclosed in the following patent document 1 (Korean Patent Publication No. 2003-0050409) of the above-mentioned gate valves includes a rectangular opening/closing disk hinge-coupled to the cylinder shaft and including four mounting rolls respectively provided on edges of the rectangle, rolling rolls configured to roll left and right side surfaces, and a rectangular O-ring sealing edges of a front surface of the disk, four mounting balls having an upward angle corresponding to the mounting roll and defined in an inner rear surface of the main body of the rectangular gate valve, and three ball plungers each of which protruding from an inner front surface of the main body and biased to left and right sides, to always apply force in a direction in which the rectangular opening/closing disk is away from a front surface of the main body, thereby ascending/descending the rectangular opening/closing disk by ascending/descending movement of the shaft and closely attaching the rectangular opening/closing disk including the O-ring to a passage of the front surface as the mounting roll mounts the mounting ball to completely seal. Thus, a sealing effect between the disk and the passage may be high and the disk may be easily manufactured.

However, when a mechanical defect is generated in the air cylinder, the mount type rectangular gate valve disclosed in the patent document 1 may not perform a typical function of closing a passage because a separate alternative opening/closing unit is not provided. Thus, management and repair of the mechanical defect may not be instantly performed.

Also, since a component for guiding vertical movement of the rectangular opening/closing disk is not provided in the air cylinder, the shaft connected to the air cylinder may not exactly move upward and downward due to difference of a pneumatic pressure in the air cylinder. Thus, vertical and horizontal movement of the rectangular opening/closing disk may not be smoothly performed.

BRIEF SUMMARY OF THE INVENTION

The present invention is made in an effort to solve the above problems. It is an object of the prevent invention is to provide a two-way gate valve in which, as first and second blades that are independently operated are respectively provided to upper and lower portions of the gate valve, although the first blade may not be operated due to a mechanical defect, the second blade may be operated to smoothly open/close first and second moving paths, thereby securing work continuity, and the first blade may be repaired without restriction of driving.

Also, it is another object of the present invention to provide a two-way gate valve in which as first, second, and third rollers are respectively provided to a L-motion block and a moving unit, which vertically and horizontally move the first blade, and a rotation guide groove, a L-motion block moving groove, a moving unit guide groove, into which the first, second, and third rollers are respectively inserted, are defined in each of both inner side surfaces of a lower housing, the first blade may exactly move in vertical and horizontal directions.

In addition, it is a further object of the present invention to provide a two-way gate valve in which as a guide link including a second roller inserted into the L-motion block moving groove is provided on each of both side surfaces of the L-motion block, a constant distance between the L-motion block and the moving unit may be always maintained while the L-motion block moves along the L-motion block moving groove in up, down, left, and right directions to perform exact operation of the first blade.

To solve the foregoing problems, a two-way gate valve 1 according to the present invention includes: an upper housing 100 having openings that are respectively defined in a front surface and a rear surface thereof and in which first and second moving paths 110 and 120 are defined; a first blade 200 installed in the upper housing 100 to move upward from a lower side, thereby opening/closing the first moving path 110; a first shaft 300 coupled to a lower portion of the first blade 200; a lower housing 400 disposed below the upper housing 100, in which a rotation guide groove 410 for guiding rotation of a L-motion block 500 at a fixed position while the first blade 200 moves in a close direction C is defined in each of both inner surfaces of the lower housing 400; the L-motion block 500 installed in the lower housing 400 and coupled to a lower portion of the first shaft 300, in which the L-motion block 500 includes a first roller 510 inserted into the rotation guide groove 410 on each of both upper portions thereof and a coupling part 520 connected to a moving unit 600 on a lower portion thereof; the moving unit 600 including a rotatable link 610 at a central portion thereof, in which the link 610 has one side connected to the coupling part 520 and the other side connected to a driving unit 700 to rotate the L-motion block 500; a first driving unit 700 connected to the link 610 to vertically move the L-motion block 500; a second blade 800 installed in the upper housing 100 to move downward from an upper side, thereby opening/closing the first and second moving paths 110 and 120 at the same time, in which, while the first and second moving paths 110 and 120 are opened/closed, sealing plates 820 respectively disposed on both sides thereof are spread in outward directions to respectively seal the first and second moving paths 110 and 120; a second shaft 900 coupled to an upper portion of the second blade 800; and a second driving unit 1000 disposed above the upper housing 100 and coupled to the second shaft 900 to vertically move the second blade 900.

Also, the second blade 800 includes: a horizontal movement guide bar 810 including a second shaft coupling part 811 coupled to the second shaft 900 at a central portion thereof and a plurality of spacing guide balls 812 rotatably provided on each of front and rear surfaces thereof; sealing plates 820 respectively provided on both sides of the horizontal movement guide bar 810 and each of which has a horizontal movement guide groove 821 contacting each of the spacing guide balls 812 to guide movement of each of the spacing guide balls 812 as the horizontal movement guide bar 810 vertically moves; and connecting members 830 provided between both inner sides of each of the sealing plates 820 to connect the sealing plates 820 to each other.

Also, the horizontal movement guide groove 821 includes a horizontal expansion section 821a recessed by a predetermined depth and a horizontal contraction section 821b extending from the horizontal expansion section 821a and recessed gradually to a depth greater than the recessed depth of the horizontal expansion section 821a. The sealing plates 820 are pushed outward to respectively seal the first and second moving paths 110 and 120 in a state in which the spacing guide ball 812 is positioned in the horizontal expansion section 821a, and the sealing plates 820 move inward to respectively open the first and second moving paths 110 and 120 in a state in which the spacing guide ball 812 is positioned in the horizontal contraction section 821b.

Also, a movement restricting part 831 exposing to the outside of the second blade 800 is provided on a side surface of each of the connecting members 830, and a support part 140 supporting the movement restricting part 831 of the second blade 800 while the second blade 800 descends to restrict vertical movement of the second blade 800 is provided on each of both inner surfaces of the upper housing 100.

Also, a L-motion block moving groove 420 includes a vertical movement groove 421 vertically defined and a closing groove 422 horizontally extending from an upper portion of the vertical movement groove 421 in the closing direction C is defined in each of both inner side surfaces of the lower housing 400, and a guide link 530 is rotatably provided on each of both sides of the coupling part 520 and includes a second roller 531 inserted into the vertical movement path 421 to adjust a distance between the L-motion block 500 and the moving unit 600.

Also, a moving unit guide groove 430 guiding vertical movement of the moving unit 600 is defined in each of both inner side surfaces of the lower housing 400, and a third roller 620 inserted into the moving unit guide groove 430 to guide the vertical movement of the moving unit 600 is provided on each of both sides of the moving unit 600.

As described above, according to the present invention, as the first and second blades that are independently operated are provided on the upper and lower portion of the gate valve, although the first blade may not be operated due to the mechanical defect, the second blade may be operated to smoothly open/close the first and second moving paths, thereby securing the work continuity, and the first blade may be repaired without the restriction of driving.

Also, according to the present invention, the first, second, and third rollers are respectively provided to the L-motion block and the moving unit, which vertically and horizontally move the first blade, and the rotation guide groove, the L-motion block moving groove, the moving unit guide groove, into which the first, second, and third rollers are respectively inserted, are defined in each of the both inner side surfaces of the lower housing, the first blade may exactly move in the vertical and horizontal directions.

In addition, according to the present invention, as the guide link including the second roller inserted into the L-motion block moving groove is provided on each of the both side surfaces of the L-motion block, the constant distance between the L-motion block and the moving unit may be always maintained while the L-motion block moves along the L-motion block moving groove in the up, down, left, and right directions to perform the exact operation of the first blade.

DETAILED DESCRIPTION OF EMBODIMENTS

Figure 1:
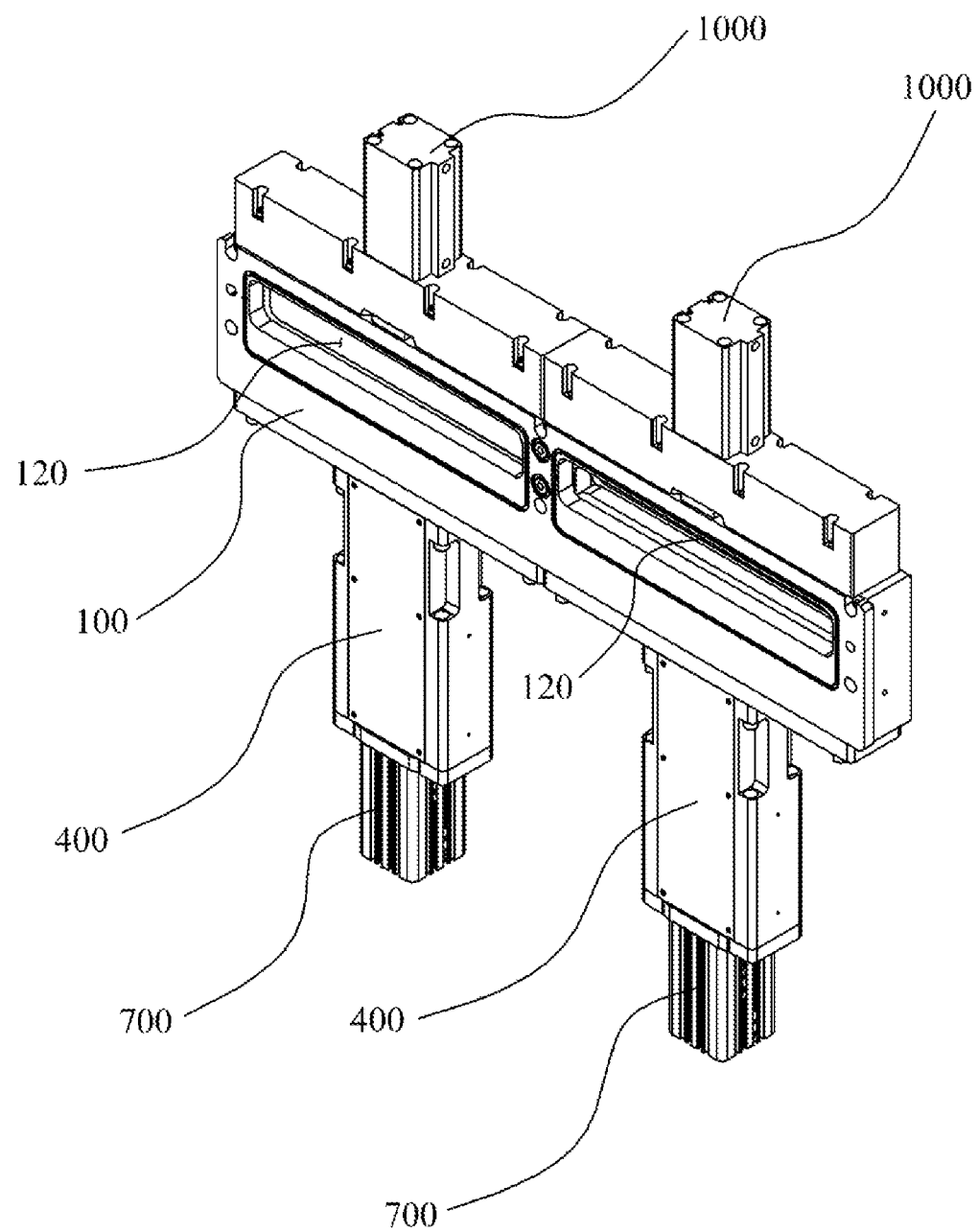
FIG. 1 is a perspective view illustrating an overall appearance of a two-way gate valve according to a preferred embodiment of the present invention.

Hereinafter, a two-way gate valve 1 according to an embodiment of the present invention will be described in detail with reference to the accompanying drawings, Note that the same or similar components in the drawings are designated by the same reference numerals as far as possible even if they are shown in different drawings. In describing the present invention, detailed descriptions related to well-known functions or configurations will be ruled out in order not to unnecessarily obscure subject matters of the present invention.

Figure 2:
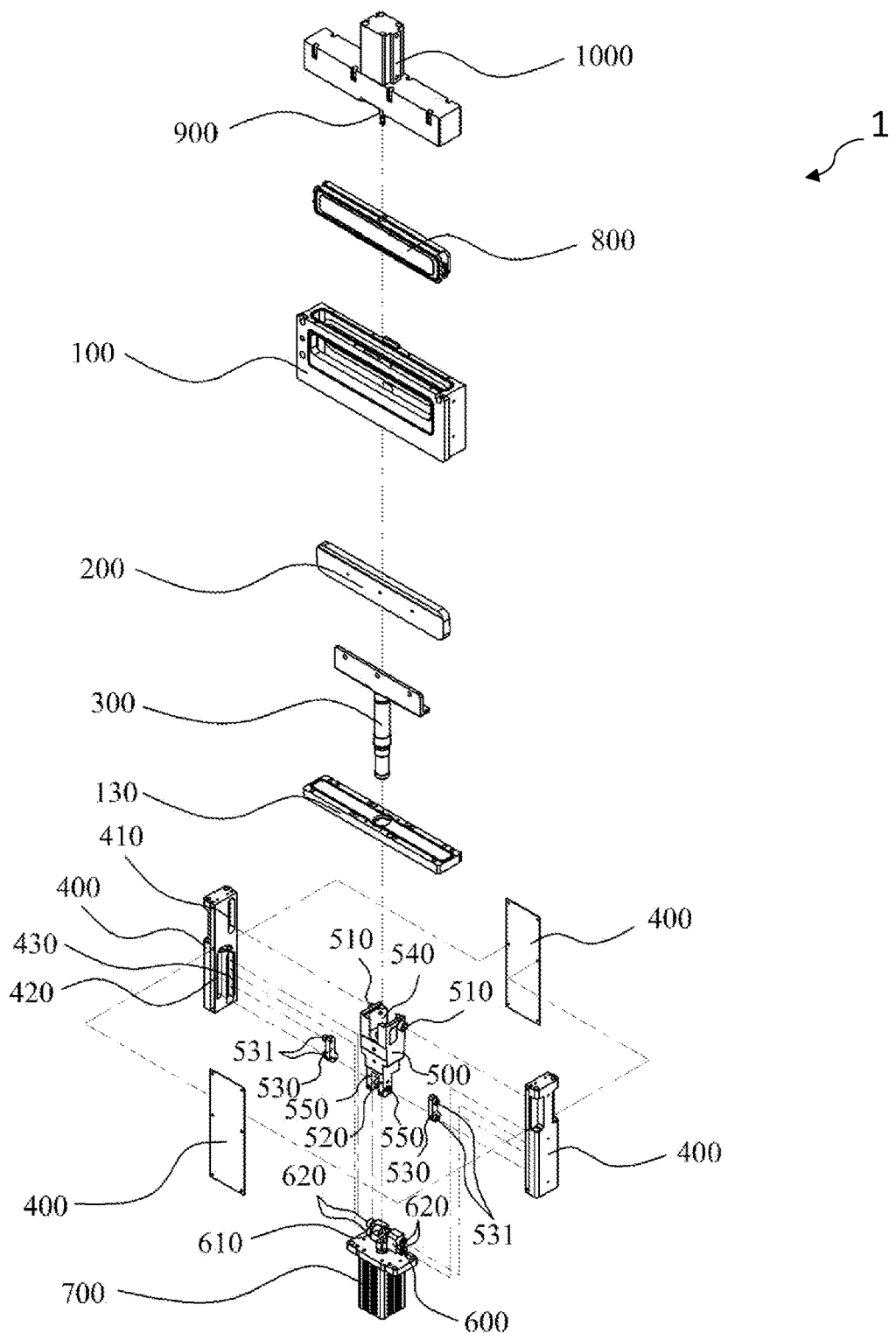
FIG. 2 is an exploded perspective view illustrating a state in which the two-way gate valve is exploded according to a preferred embodiment of the present invention.

Referring to FIG. 2, the two-way gate valve 1 according to an embodiment of the present invention largely includes an upper housing 100, a first blade 200, a first shaft 300, a lower housing 400, a L-motion block 500, a moving unit 600, a first driving unit 700, a second blade 800, a second shaft 900, and a second driving unit 1000.

Before describing the present invention, as illustrated in FIG. 1, the two-way gate valve 1 may be desirably constituted such that two two-way gate valves 1 are integrated with each other, or may be constituted by one two-way gate valve 1 according to an installation space.

Also, note that the same numerical number refers to symmetric components of the two-way gate valve 1, and drawings illustrated in FIGS. 2 to 12 are illustrated with reference to any one of the two two-way gate valves 1 in FIG. 1.

Figure 4:
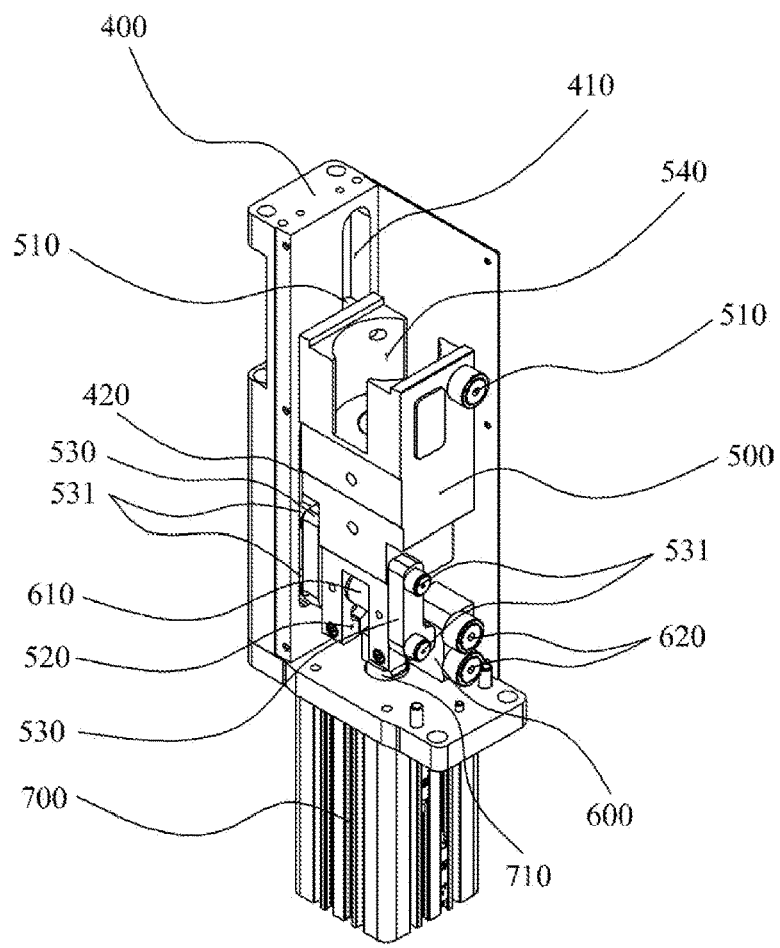
FIG. 4 is an inner perspective view illustrating a coupling relationship of a lower housing, L-motion block, and a moving unit of a constitution of the two-way gate valve according to a preferred embodiment of the present invention.
Figure 5:
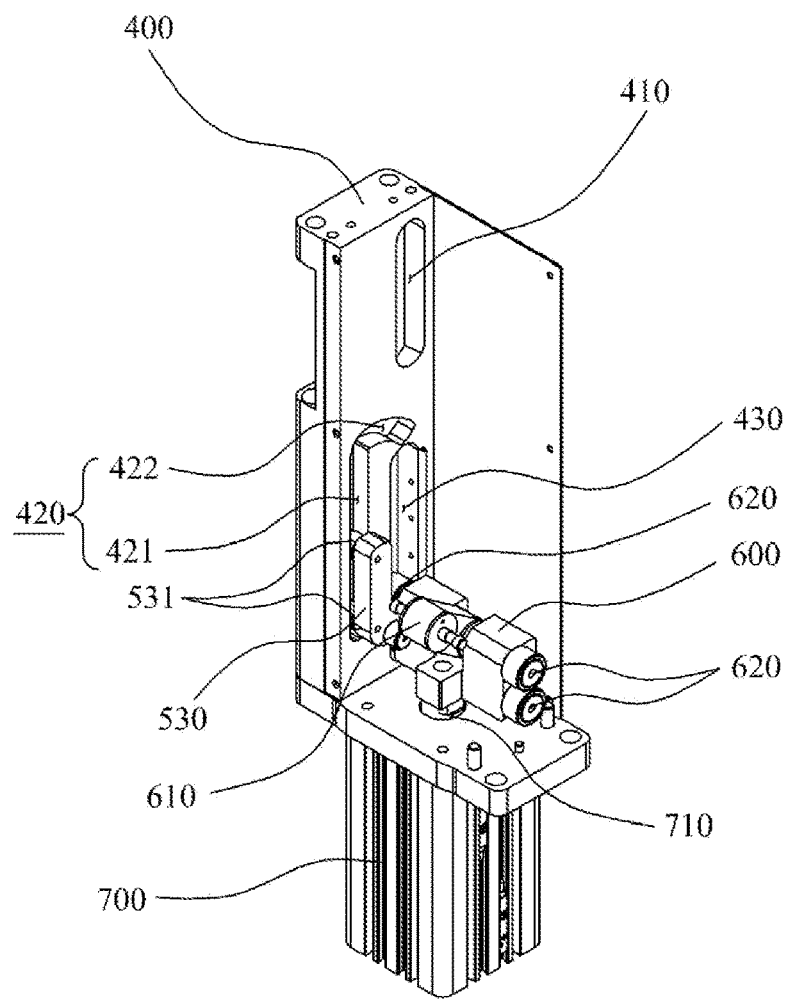
FIG. 5 is an inner perspective view illustrating a coupling relationship between second and third rollers and the lower housing of a constitution of the two-way gate valve according to a preferred embodiment of the present invention.

In addition, note that a portion of a lower housing 400 in FIGS. 4 and 5 is removed to illustrate an inner appearance of the lower housing 400 in detail.

Figure 6:
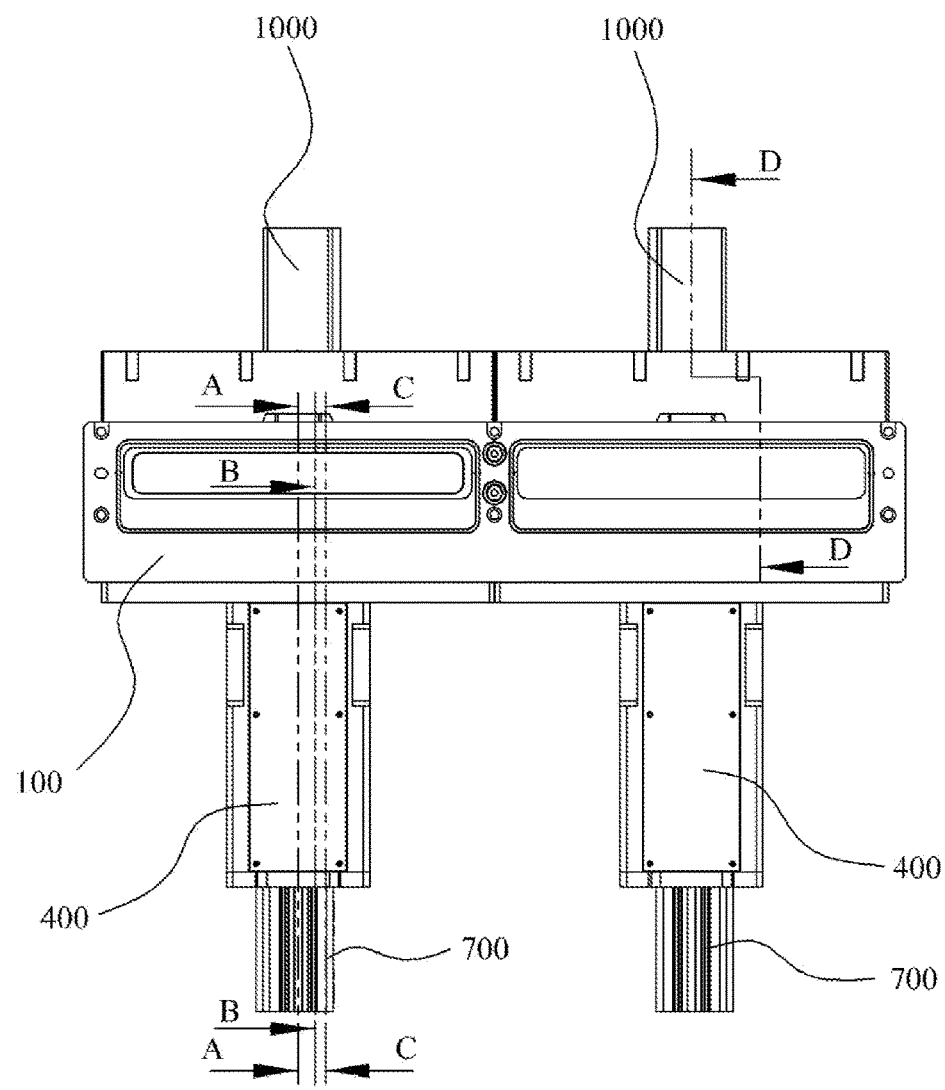
FIG. 6 is a front view illustrating a front of the two-way gate valve according to a preferred embodiment of the present invention.
Figures 7A, 7B, 7C:
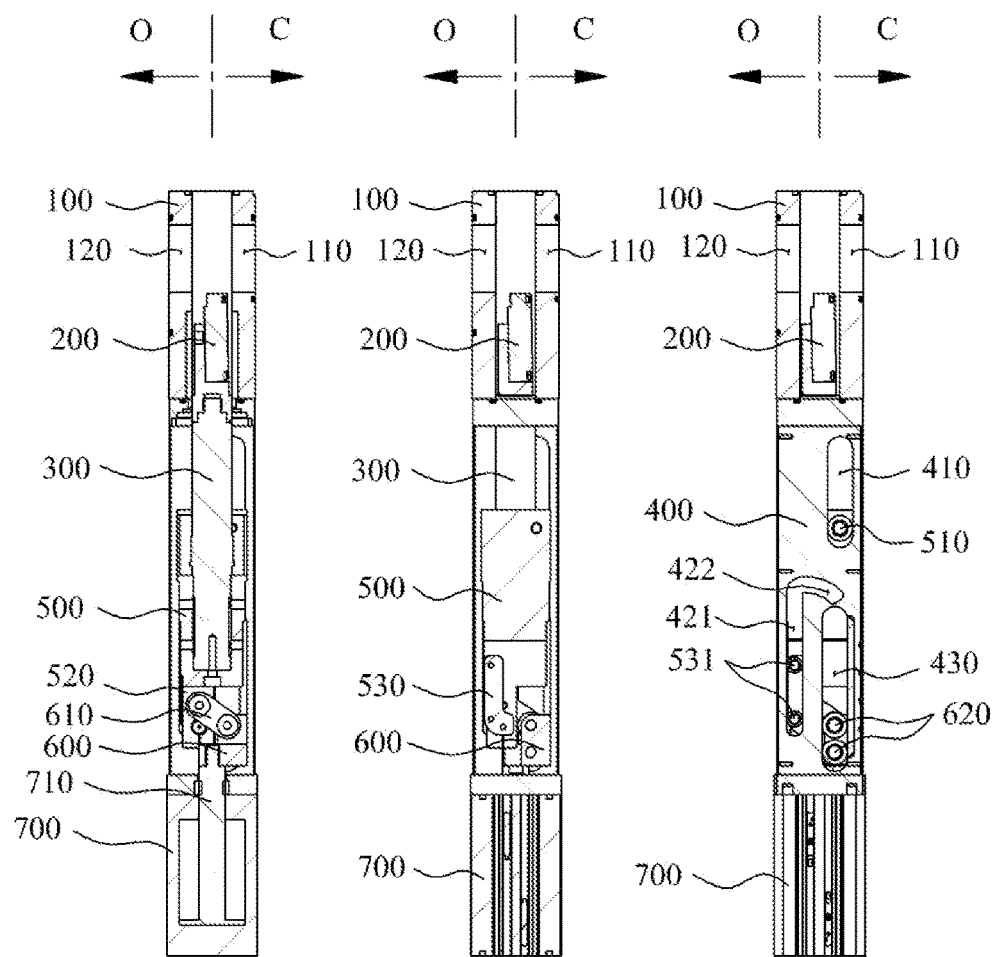
FIG. 7A, FIG. 7B, and FIG. 7C shows cross-sectional views illustrating a state before a first blade is operated through cross-sections respectively taken along lines A-A, B-B, and C-C of FIG. 6.

First, the upper housing 100 will be described. As illustrated in FIGS. 1, 6, and 7, the upper housing 100 is a component in which first and second moving paths 110 and 120 through which a semiconductor device such as a wafer moves are perforated in both side surfaces thereof, and first and second blades 200 and 800, which will be described later, are provided inside the upper housing 100 to provide a driving space (not shown) in which the first and second moving paths 110 and 120 are opened/closed.

Figure 13:
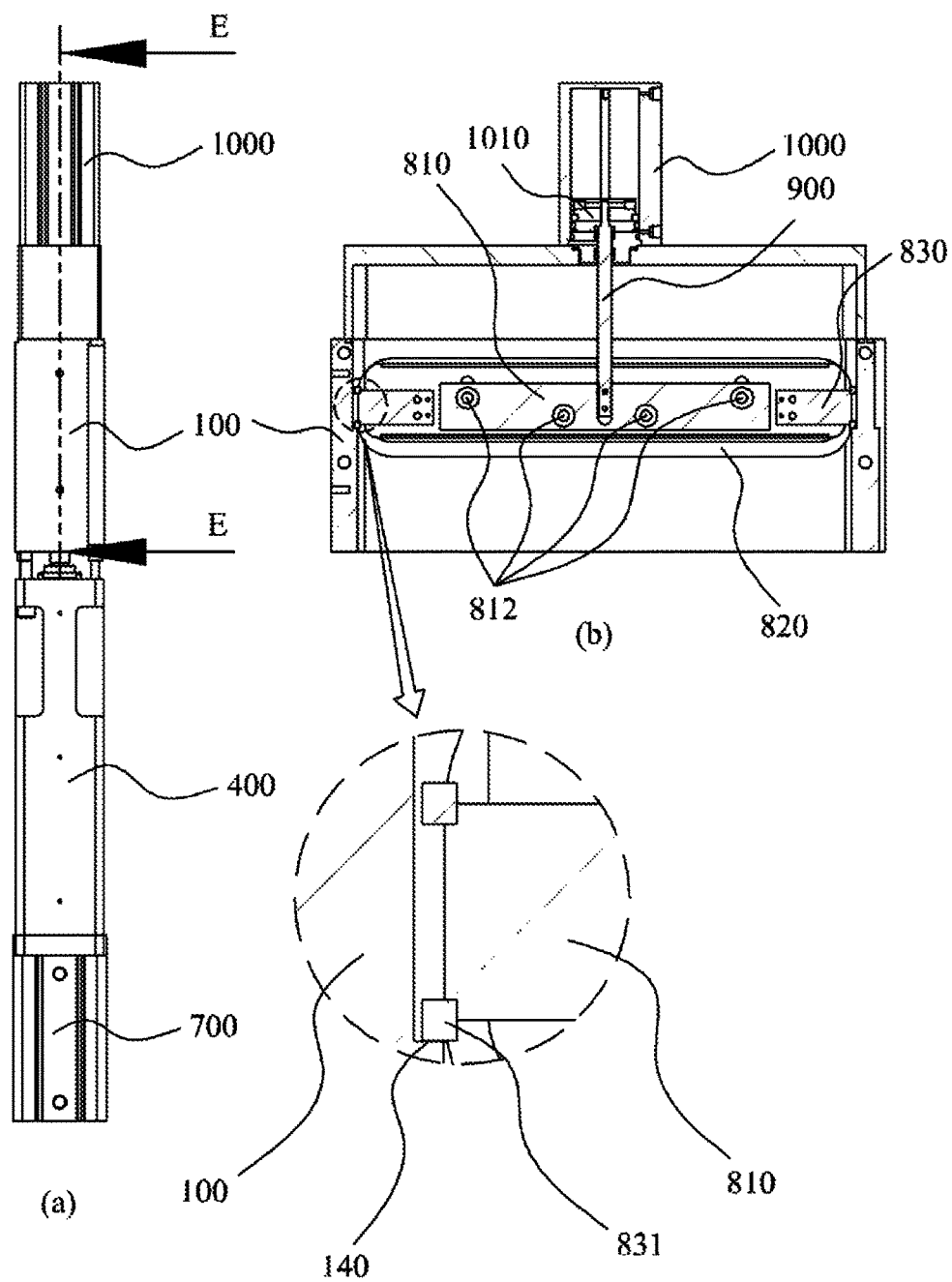
FIG. 13 is a side view illustrating a side of the two-way gate valve and a cross-sectional view illustrating a cross-section taken along line E-E of the side view to a preferred embodiment of the present invention.

Meanwhile, as illustrated in FIG. 13, a seat part 140 protruding in an inward direction is provided on each of both inner side surfaces of the upper housing 100. As the seat part 140 supports a movement restricting part 831, which will be described later, of the second blade 800 while the second blade 800 descends to close the first and second moving paths 110 and 120, vertical movement of sealing plates 820, which will be described later, of the second blade 800 connected to the movement restricting part 831 is restricted, and a horizontal movement guide bar 810, which will be described later, of the second blade 800 descends by using a vertical force generated by a second driving unit 1000, which will be described later, in a state in which the vertical movement of the sealing plates 820 is restricted to spread the sealing plates 820 in a horizontal direction, and thus the sealing plates 820 respectively close the first and second moving paths 110 and 120.

Meanwhile, a finishing housing 130 is desirably installed below the upper housing 100 to prevent the first blade 200 installed in the driving space (not shown) from being separated to the outside.

Next, the first blade 200 will be described. As illustrated in FIG. 2 or 7, the first blade 200 is installed in the driving space (not shown) to move upward from a lower side by a L-motion block 500 and a moving unit 600, which will be described later, in vertical and horizontal directions, thereby opening/closing the first moving path 110.

Next, the first shaft 300 will be described. As illustrated in FIG. 2 or 7, the first shaft 300 is a component passing through a shaft insertion hole (not shown) perforated in the finishing housing 130 and coupled to a lower portion of the first blade 200 installed in the driving space (not shown). The first shaft 300 transmit a driving force of the L-motion block 500 and the moving unit 600, which are operated by a first driving unit 700 that will be described later, to the first blade 200 to enable the first blade 200 to move in the vertical and horizontal direction.

Next, the lower housing 400 will be described. As illustrated in FIG. 2, 4, or 5, the lower housing 400 is a sort of a housing coupled to a lower portion of the finishing housing 130 to accommodate the L-motion block 500 and the moving unit 600. The lower housing 400 includes a rotation guide groove 410, an L-motion block movement groove 420, and a moving unit guide groove 430.

The rotation guide groove 410 is a component vertically recessed in each of both inner side surfaces of the lower housing 400. The rotation guide groove 410, to which a first roller 510, which will be described later, of the L-motion block 500 is inserted therein, guides exact vertical movement of the L-motion block 500 and also enables the L-motion block 500 to exactly shaft-rotate at a fixed position depending on whether the moving unit 600 is operated or not.

The L-motion block movement groove 420 includes a vertical movement groove 421 vertically recessed in each of the both inner side surfaces of the lower housing 400 and a closing groove 422 extending and recessed from an upper portion of the vertical movement groove 421 to the closing direction C in the horizontal direction. The L-motion block movement groove 420, to which a second roller 510, which will be descried later, of a guide link 530 is inserted, guides exact vertical movement of the L-motion block 500 connected to the guide link 520.

The moving unit guide groove 430 is a component vertically recessed in each of the both inner side surfaces of the lower housing 400. The moving unit guide groove 430, to which a third roller 620, which will be described later, of the moving unit 600 is inserted, guides exact vertical movement of the moving unit 600.

Next, the L-motion block 500 will be described. As illustrated in FIG. 2 or 4, the L-motion block 500 is a component connected to the moving unit 600 to perform a mechanical operation for moving the first blade 200 in the vertical and horizontal directions. The L-motion block 500 includes a first roller 510, a coupling part 520, a guide link 530, and a shaft connecting part 540.

The first roller 510 is a component provided in plurality and rotatably provided on each of both upper portions of the L-motion block 500. The first roller 510 is inserted into the rotation guide groove 410 and serves to guide exact vertical movement of the L-motion block 500 driven by the first driving unit 700.

The coupling part 520 is a component having a ∩-shape and provided below the L-motion block 500. A link 610, which will be described later, of the moving unit 600 is inserted into and rotatably connected to a central space of the coupling part 520, and a guide link 530 is rotatably connected to each of both side surfaces thereof.

The guide link 530 is rotatably connected to an insertion protrusion 550 protruding from each of the both side surfaces of the coupling part 520 to guide the exact vertical movement of the L-motion block 500.

Meanwhile, when the L-motion block 500 rotates in the closing direction C, the guide link 530 adjusts a distance between the L-motion block 500 and the moving unit 600 while the first roller 510 disposed at the uppermost moves from the vertical movement groove 421 to the closing groove 422 to stably rotate the L-motion block 500.

Meanwhile, as a catching protrusion (not shown) interfering movement of the moving unit 600 protrudes from a lower portion of the guide link 530, since an operation of the moving unit 600 is restricted before the vertical movement of the L-motion block 500 is completed (a state before the guide link 530 rotates in the closing direction C) while the L-motion block 500 and the moving unit 600 vertically move by the first driving unit 700, following operation (a process of rotating the L-motion block 500 in the closing direction C) may be smoothly performed.

The first shaft connecting part 540, to which a lower portion of the first shaft 300 is inserted, enables the first shaft 300 to vertically and horizontally move depending on whether the L-motion block 500 and the moving unit 600 are operated or not.

Next, the moving unit 600 will be described. As illustrated in FIG. 2, 4, or 5, the moving unit 600 is a component connected between the L-motion block 500 and the first driving unit 700 to transmit a driving force of the first driving unit 700 to the L-motion block 500 and rotating the L-motion block 500 that has completed the vertical movement to enable the first blade 200 to horizontally move. The moving unit 600 includes the link 610 and the third roller 620.

The link 610 is a component disposed on a central portion of the moving unit 600 while inclined at an initial predetermined angle, and having one side rotatably connected to the coupling part 520 and the other side rotatably connected to a first cylinder member 710 of the first driving unit 700. Through the above-described constitution of the link 610, as the L-motion block 500 and the moving unit 600 may realize an operation of relatively contacting or separating while maintaining a state parallel to each other, the link 610 allows the L-motion block 500 to rotate in forward and reverse directions to horizontally move the first blade 200, thereby opening/closing the first moving path 110.

The third roller 620 is a component rotatably installed on each of both sides of the moving unit 600. As the third roller 620 is inserted into the moving unit guide groove 430, the third roller 620 serves to guide exact horizontal movement of the moving unit 600.

Next, the first driving unit 700 will be described. As illustrated in FIG. 1 or 6, the first driving unit 700 is a component including a first cylinder member 710 to vertically drive the first cylinder member 710 by using a pneumatic pressure. The first driving unit 700 may be realized in a type of an actuator or a cylinder. Since it is a well-known technique in the technical field of the present invention, detailed description will not be provided.

Figure 3:
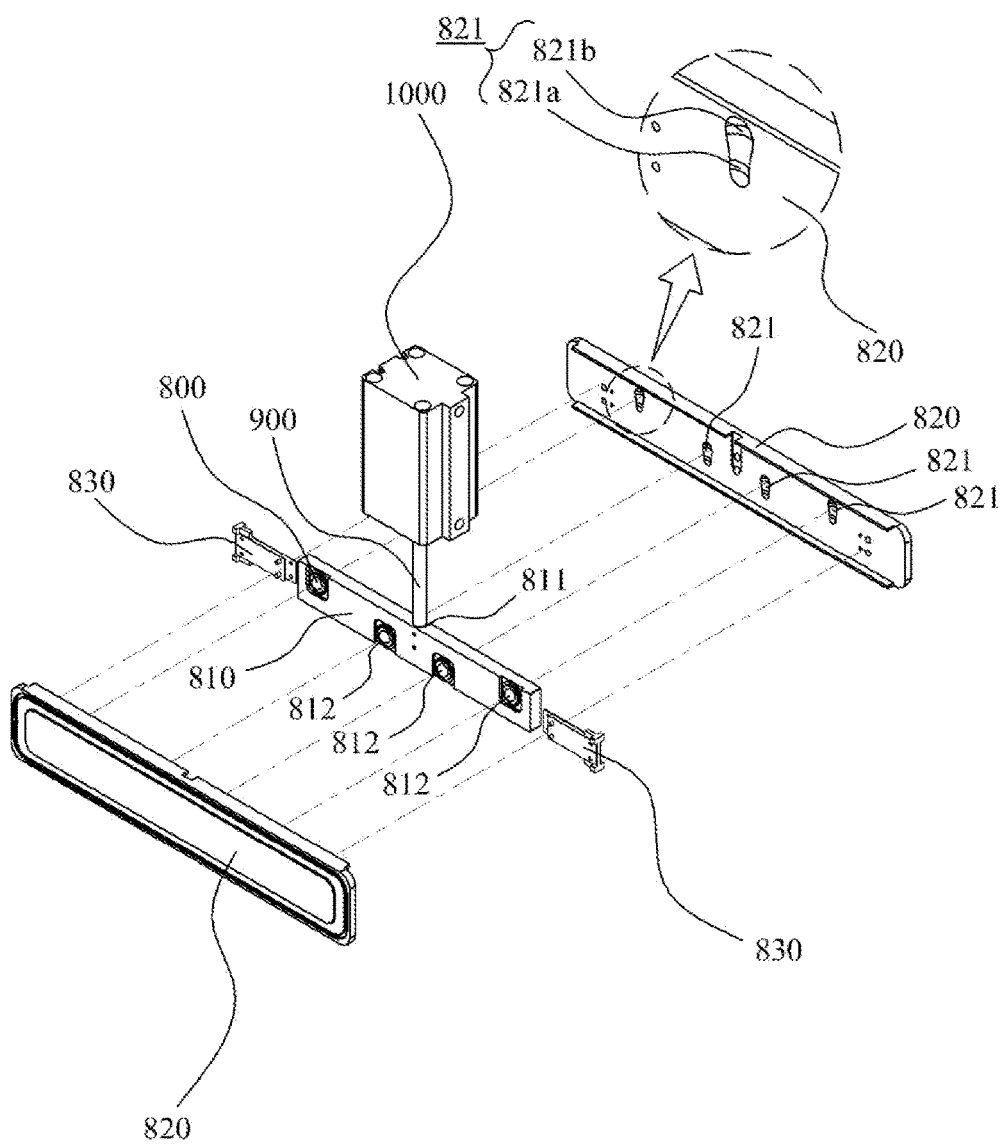
FIG. 3 is an exploded perspective view illustrating a state in which the two-way gate valve is exploded according to a preferred embodiment of the present invention.

Next, the second blade 800 will be described. As illustrated in FIG. 3, the second blade 800 is a component installed in the driving space (not shown) to move downward from an upper side by the second driving unit 1000, which will be described later, in the vertical and horizontal directions, thereby opening/closing the first moving path 110. The second blade 800 includes a horizontal movement guide bar 810, a sealing plate 820, and a connecting member 830.

The horizontal movement guide bar 810 is a movement guide member directly connected to the second shaft 900, which will be described later, to receive a driving force of the second driving unit 1000, which will be described later, thereby moving the sealing plate 820 in the vertical and horizontal directions. The horizontal movement guide bar 810 includes a second shaft coupling part 811 and a spacing guide ball 812.

The second shaft coupling part 811 is desirably coupled to the second shaft 900 through screw-coupling or press-fit on an upper portion of the horizontal movement guide bar 810.

The spacing guide ball 812 is a component rotatably provided on front and rear surfaces of the horizontal movement guide bar 810. The spacing guide ball 812 is inserted into each of the horizontal movement guide grooves 821, which will be described later, of the sealing plate 820 to move along the horizontal movement guide groove 821 by vertical movement of the horizontal movement guide bar 810, thereby allowing the sealing plate 820 to horizontally move.

The sealing plate 820 is a component provided on each of the front and rear surface sides of the horizontal movement guide bar 810 to move in the vertical and horizontal directions according to the movement of the horizontal movement guide bar 810.

Meanwhile, according to the present invention, the sealing plate 820 is characterized in that the horizontal movement guide groove 821, into which the spacing guide ball 812 is inserted to guide movement of the spacing guide ball 812 according to the vertical movement of the horizontal movement guide bar 810, thereby horizontally moving the sealing plate 820, is defined in plurality in the inner side surface thereof. The horizontal movement guide groove 821 includes a horizontal expansion section 821a recessed by a predetermined depth and a horizontal contraction section 821b extending from the horizontal expansion section 821a to recessed gradually to a depth greater than the recessed depth of the horizontal expansion section 821a.

Through the above-described constitution, when the spacing guide ball 812 is positioned at the horizontal expansion section 821a, the sealing plates 820 are pushed outward to respectively close the first and second moving paths 110 and 120, and when spacing guide ball 812 is positioned at the horizontal contraction section 821b, the sealing plates 820 move inward to respectively open the first and second moving paths 110 and 120.

The connecting member 830 is a component disposed between both inner sides of each of the sealing plates 820 to connect the sealing plates 820 to each other. The connecting member 830 is desirably made of an elastic material or a flexible material so that the sealing plate 820 is smoothly expanded and contracted in the horizontal direction.

Meanwhile, as a movement restricting part 831 exposing to the outside of the second blade 800 is further provided on a side surface of the connecting member 830, while the second blade 800 descends to close the first and second moving paths 110 and 120, when vertical movement of the second blade 800 is restricted by the seat part 140, the vertical movement of the sealing plate 820 is finished. When the horizontal movement guide bar 810 of the second blade 800 further descends by using the vertical force generated by the second driving unit 1000 in a state in which the vertical movement of the sealing plate 820 is finished, the spacing guide ball 812 moves along the horizontal movement guide groove 821, and the sealing plates 820 are horizontally spread by the horizontal movement guide groove 821, so that the sealing plates 820 respectively close the first and second moving paths 110 and 120.

Next, the second shaft 900 will be described. As illustrated in FIG. 2 or 7, the second shaft 900 is a component coupled to an upper portion of the second blade 800 installed in the driving space (not shown). The second shaft 900 transmits the driving force generated by the second driving unit 1000 to the second blade 800 to move the second blade 800 in vertical and horizontal directions.

Next, the second driving unit 1000 will be described. As illustrated in FIG. 1 or 6, the second driving unit 1000 is a component including a second cylinder member 1010, like the first driving unit 700, to vertically drive the second cylinder member 1010 by using a pneumatic pressure. Since it is a well-known technique in the technical field of the present invention, detailed description will not be provided.

Hereinafter, referring to FIGS. 7 to 9, a process in which the first blade 200 of the constitution of the two-way gate valve 1 according to an embodiment of the present invention closes the first moving path will be described.

First, as illustrated in FIG. 7, the first blade 200, the first shaft 300, and the L-motion block 500 maintain an inclined state in an opening direction O in a state before initial operation.

Figures 8A, 8B, 8C:
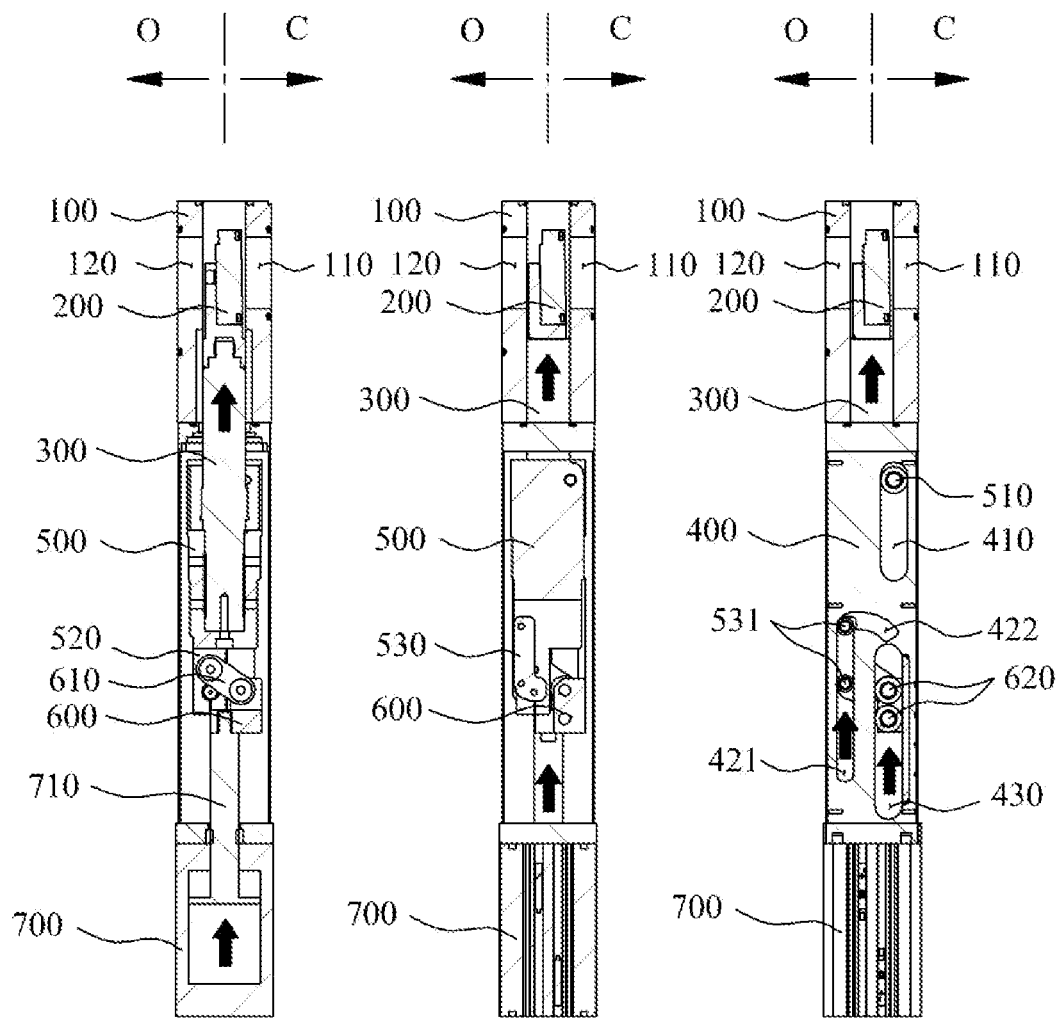
FIG. 8A, FIG. 8B, and FIG. 8C shows cross-sectional views illustrating a state in which vertical movement of the first blade is completed through the cross-sections respectively taken along lines A-A, B-B, and C-C of FIG. 6.

Thereafter, as illustrated in FIG. 8, when the first cylinder member 710 is vertically lifted by an operation of the first driving unit 700, the first blade 200, the first shaft 300, and the L-motion block 500 are vertically lifted in the state inclined in the opening direction O, and, at the same time, the first, second, and third rollers 510, 531, and 620 respectively move along the rotation guide groove 410, the L-motion block movement groove 420, and the moving unit guide groove 430 in an upward direction.

In this state, the guide link 530 moves while maintaining the perpendicular state, and the link 610 moves while maintaining the initial inclined state.

Figures 9A, 9B, 9C:
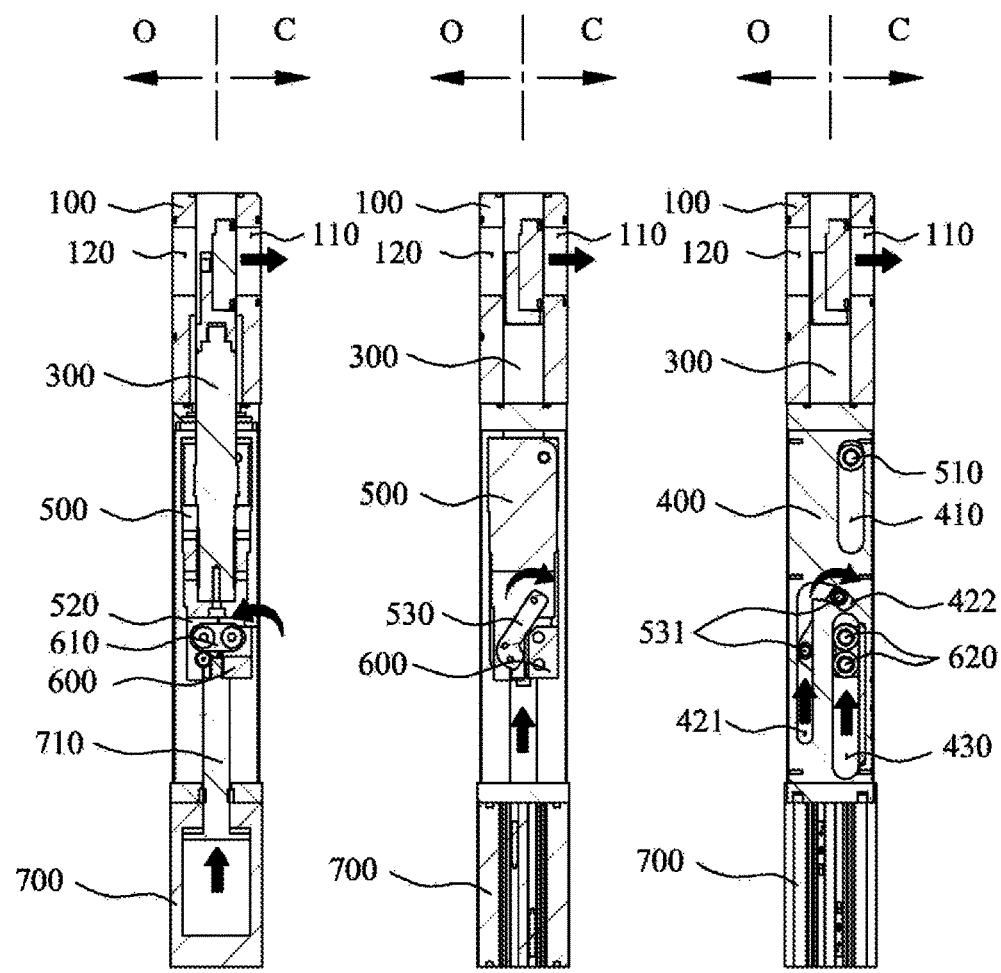
FIG. 9A, FIG. 9B, and FIG. 9C shows cross-sectional views illustrating a state in which horizontal movement of the first blade is completed through the cross-sections respectively taken along lines A-A, B-B, and C-C of FIG. 6.

Thereafter, as illustrated in FIG. 9, only the moving unit 600 is lifted by a predetermined height by the first cylinder member 710 continuously ascending in a state in which the vertical movement of the L-motion block 500 is completed, and due to this, as the link 610 is converted from the inclined state to a parallel state, the lower portion of the L-motion block 500 is pushed in the opening direction O, so that resultantly the L-motion block 500 rotate with respect to the first roller 510 in the closing direction C and the L-motion block 500 is in the perpendicular state.

As the L-motion block 500 becomes in the perpendicular state, the first blade 200 connected to the L-motion block 500 and the first shaft 300 also move in the closing direction C to make the perpendicular state, and the first blade 200 closes the first moving path 110.

Meanwhile, a process of opening the first moving path 110 is performed in a reverse order of the closing process.

Hereinafter, referring to FIGS. 10 to 12, a process in which the second blade 800 of the constitution of the two-way gate valve 1 according to an embodiment of the present invention closes the first and second moving paths 110 and 120 will be described.

Figure 10:
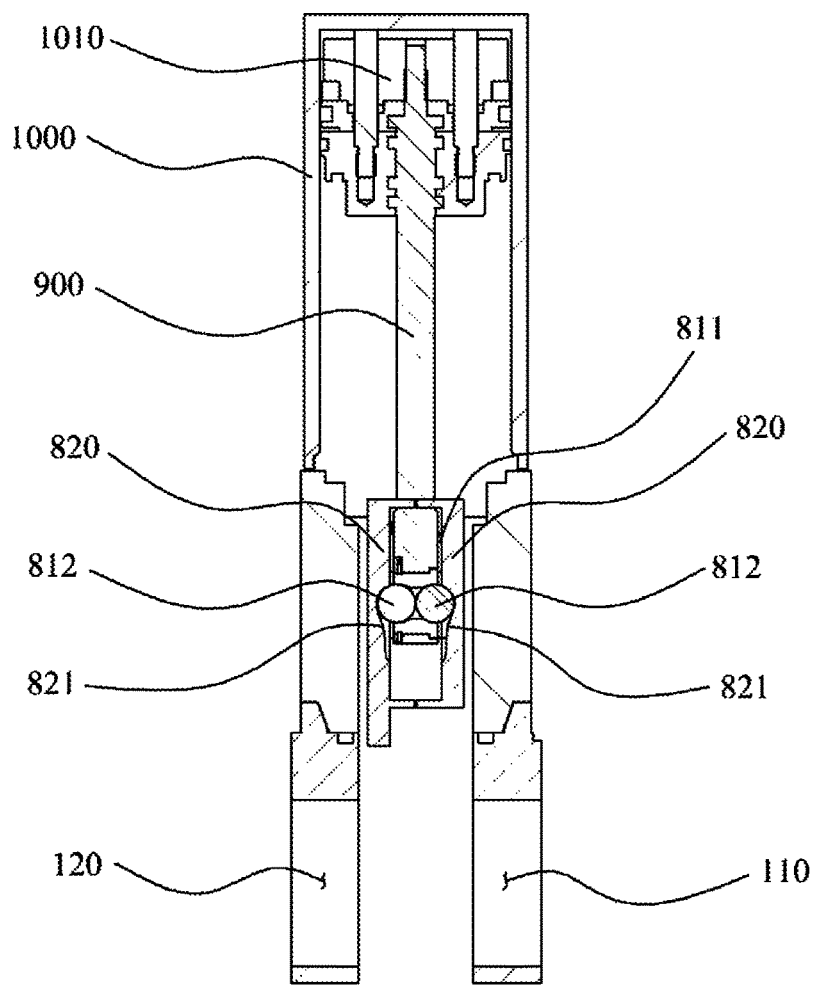
FIG. 10 is a cross-sectional view illustrating a state in which a second blade is operated through a cross-section taken along line D-D of FIG. 6.

First, as illustrated in FIG. 10, before the second blade 800 is initially operated, the spacing guide balls 812 are disposed in the horizontal contraction sections 812b, respectively.

Figure 11:
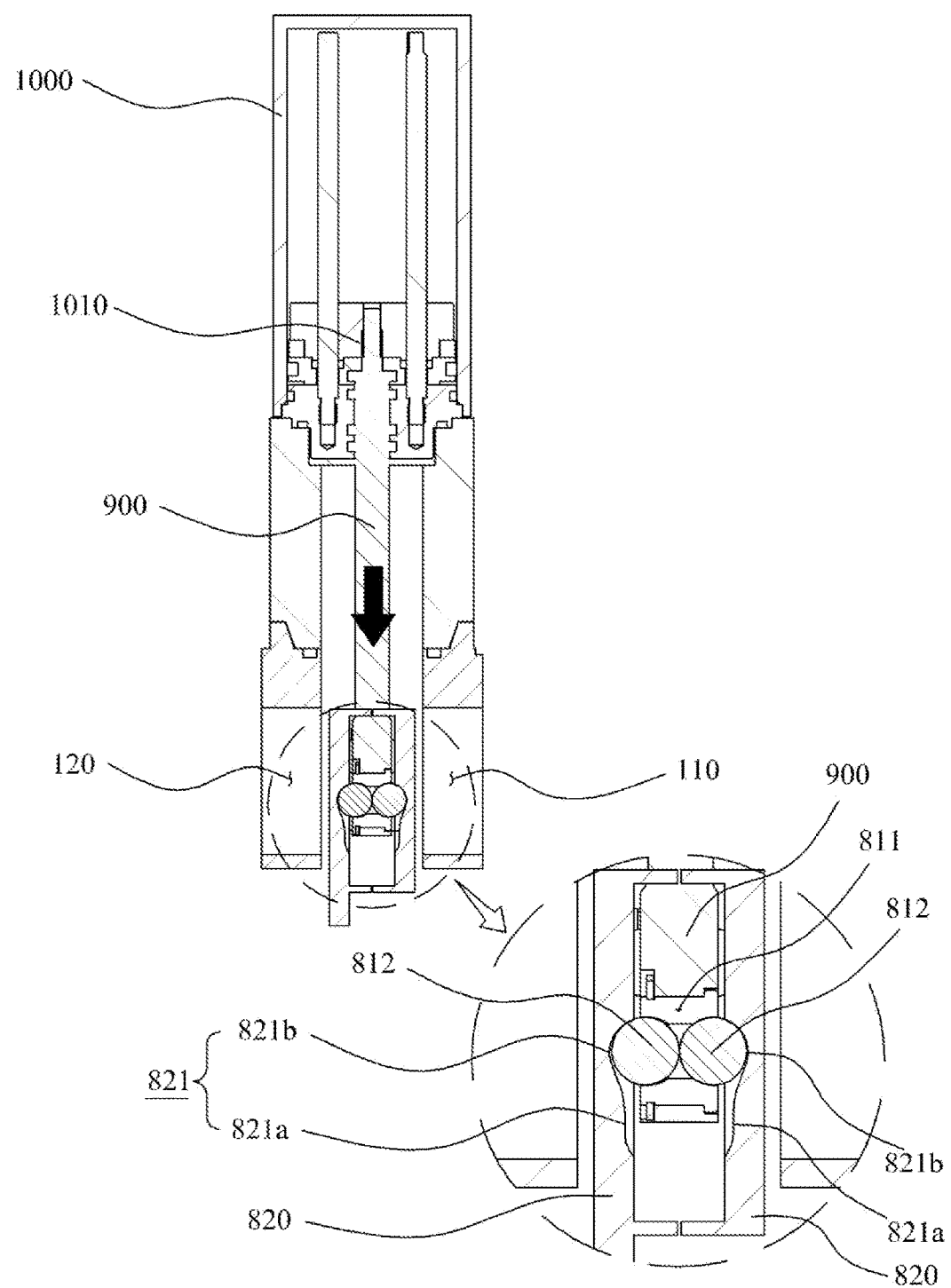
FIG. 11 is a cross-sectional view illustrating a state in which vertical movement of the second blade is completed through the cross-section taken along line D-D of FIG. 6.

Thereafter, as illustrated in FIG. 11, when the second cylinder member 1010 vertically descends by the operation of the second driving unit 1000, the second shaft 900 connected to the second cylinder member 1010 also descends, and the second blade 800 including the horizontal movement guide bar 810 connected to the second shaft 900 also descends.

Here, the spacing guide balls 812 maintain positions in the horizontal contraction section 812b, respectively.

Thereafter, the second blade 800 becomes in a state in which the connecting member 830 is caught by the seat part 140 not to further descend, thereby completing the vertical movement.

Figure 12:
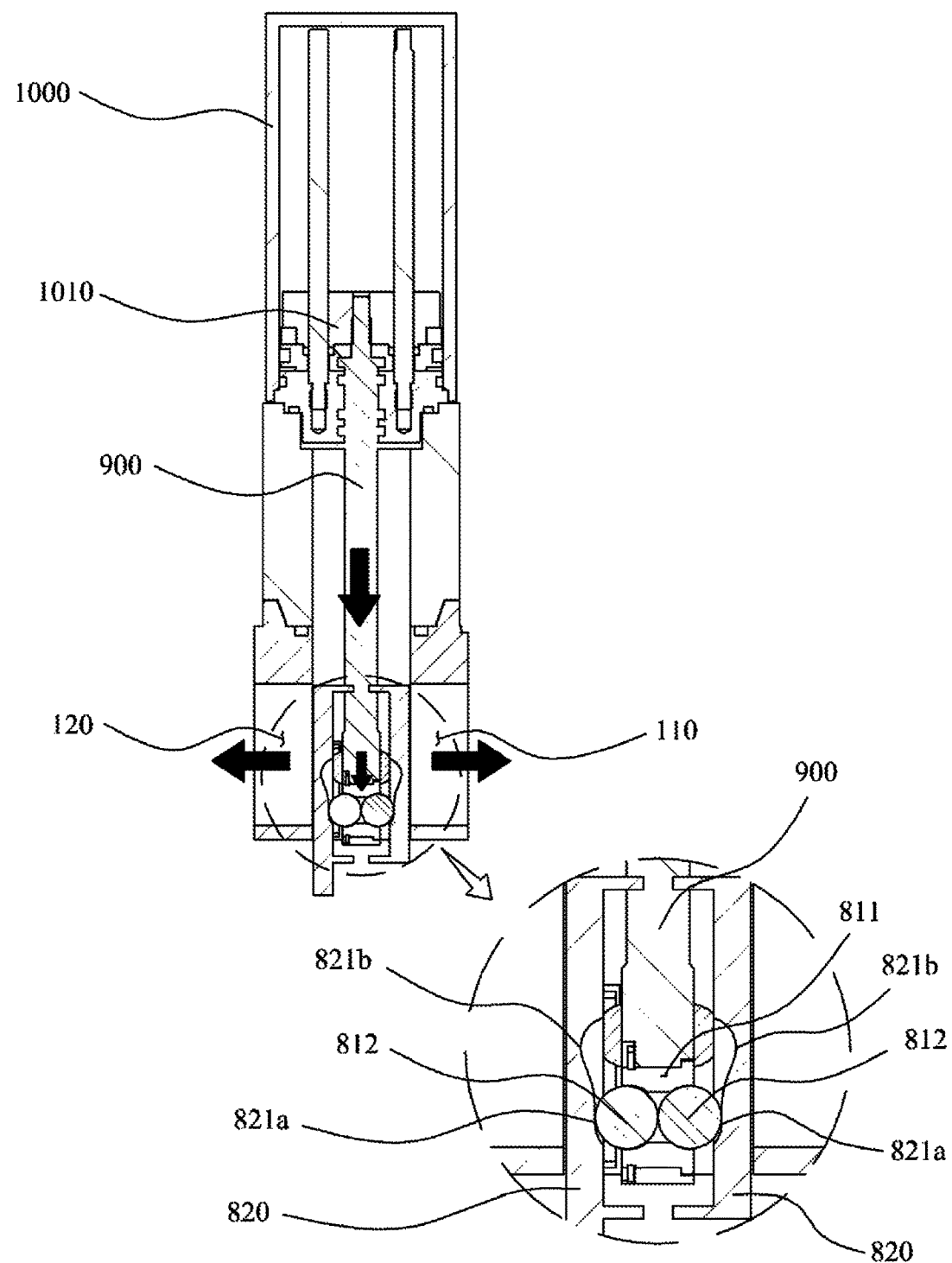
FIG. 12 is a cross-sectional view illustrating a state in which horizontal movement of the second blade is completed through the cross-section taken along line D-D of FIG. 6.

Thereafter, as illustrated in FIG. 12, when the driving force of the second driving unit 1000 is continuously applied to the second cylinder member 1010 in a state in which the vertical movement of the sealing plate 820 is restricted in a downward direction, the second cylinder member 1010 continues to descend, and the horizontal movement guide bar 810 moves by a predetermined distance in the downward direction.

Accordingly, as the spacing guide balls 812 move from the horizontal contraction section 821b to the horizontal expansion section 821a, and the sealing plates 820 are spread from each other in the horizontal direction due to characteristics of the inclinedly provided horizontal movement guide groove 821, the sealing plates 820 respectively close the first and second moving paths 110 and 120.

Meanwhile, the process of opening the first and second moving paths 110 and 120 is performed in a reverse order of the closing process.

The present invention has been particularly shown and described with reference to exemplary embodiments thereof. While specific terms were used, they were not used to limit the meaning or the scope of the present invention described in Claims, but merely used to explain the present invention. Accordingly, a person having ordinary skill in the art will understand from the above that various modifications and other equivalent embodiments are also possible. Hence, the real protective scope of the present invention shall be determined by the technical scope of the accompanying claims.

What is claimed is:

1. A two-way gate valve (1) comprising:
an upper housing (100) having openings that are respectively defined in a front surface and a rear surface thereof and in which first and second moving paths (110, 120) are defined;
a first blade (200) installed in the upper housing (100) to move upward from a lower side, thereby opening/closing the first moving path (110);
a first shaft (300) coupled to a lower portion of the first blade (200);
a lower housing (400) disposed below the upper housing (100), wherein a rotation guide groove (410) for guiding rotation of a L-motion block (500) at a fixed position while the first blade (200) moves in a close direction (C) is defined in each of both inner surfaces of the lower housing (400);
the L-motion block (500) installed in the lower housing (400) and coupled to a lower portion of the first shaft (300), wherein the L-motion block (500) comprises a first roller (510) inserted into the rotation guide groove (410) on each of both upper portions thereof and a coupling part (520) connected to a moving unit (600) on a lower portion thereof;
the moving unit (600) comprising a rotatable link (610) at a central portion thereof, wherein the link (610) has one side connected to the coupling part (520) and the other side connected to a first driving unit (700) to rotate the L-motion block (500);
the first driving unit (700) connected to the link (610) to vertically move the L-motion block (500);
a second blade (800) installed in the upper housing (100) to move downward from an upper side, thereby opening/closing the first and second moving paths (110, 120) at the same time, wherein, while the first and second moving paths (110, 120) are opened/closed, sealing plates (820) respectively disposed on both sides thereof are spread in outward directions to respectively seal the first and second moving paths (110, 120), the second blade (800) comprising a horizontal movement guide bar (810) comprising a second shaft coupling part (811) coupled to a second shaft (900) at a central portion thereof and a plurality of spacing guide balls (812) rotatably provided on each of front and rear surfaces thereof; sealing plates (820) respectively provided on both sides of the horizontal movement guide bar (810) and each of which has a horizontal movement guide groove (821) contacting each of the spacing guide balls (812) to guide movement of each of the spacing guide balls (812) as the horizontal movement guide bar (810) vertically moves; and connecting members (830) provided between both inner sides of each of the sealing plates (820) to connect the sealing plates (820) to each other;
the second shaft (900) coupled to an upper portion of the second blade (800);
a second driving unit (1000) disposed above the upper housing (100) and coupled to the second shaft (900) to vertically move the second blade (800);
wherein the horizontal movement guide groove (821) comprises a horizontal expansion section (821a) recessed by a predetermined depth and a horizontal contraction section (821b) extending from the horizontal expansion section (821a) and recessed gradually to a depth greater than the recessed depth of the horizontal expansion section (821a) and wherein the sealing plates (820) are pushed outward to respectively seal the first and second moving paths (110, 120) in a state in which the spacing guide ball (812) is positioned in the horizontal expansion section (821a), and the sealing plates (820) move inward to respectively open the first and second moving paths (110, 120) in a state in which the spacing guide ball (812) is positioned in the horizontal contraction section (821b); and
wherein a movement restricting part (831) projecting from the outside of the second blade (800) is provided on a side surface of each of the connecting members (830), and
a support part (140) supporting the movement restricting part (831) of the second blade (800) while the second blade (800) descends to restrict vertical movement of the second blade (800) is provided on each of both inner surfaces of the upper housing (100).

2. The two-way gate valve (1) of claim 1, wherein a L-motion block moving groove (420) comprising a vertical movement groove (421) vertically defined and a closing groove (422) horizontally extending from an upper portion of the vertical movement groove (421) in the closing direction (C) is defined in each of both inner side surfaces of the lower housing (400), and
a guide link (530) is rotatably provided on each of both sides of the coupling part (520) and comprises a second roller (531) inserted into the vertical movement path (421) to adjust a distance between the L-motion block (500) and the moving unit (600).

3. The two-way gate valve (1) of claim 1, wherein a moving unit guide groove (430) guiding vertical movement of the moving unit (600) is defined in each of both inner side surfaces of the lower housing (400), and
a third roller (620) inserted into the moving unit guide groove (430) to guide the vertical movement of the moving unit (600) is provided on each of both sides of the moving unit (600).

* * * * *